Feb. 24, 1959     L. KRAUS     2,874,556
UNIVERSAL JOINT
Filed July 5, 1955
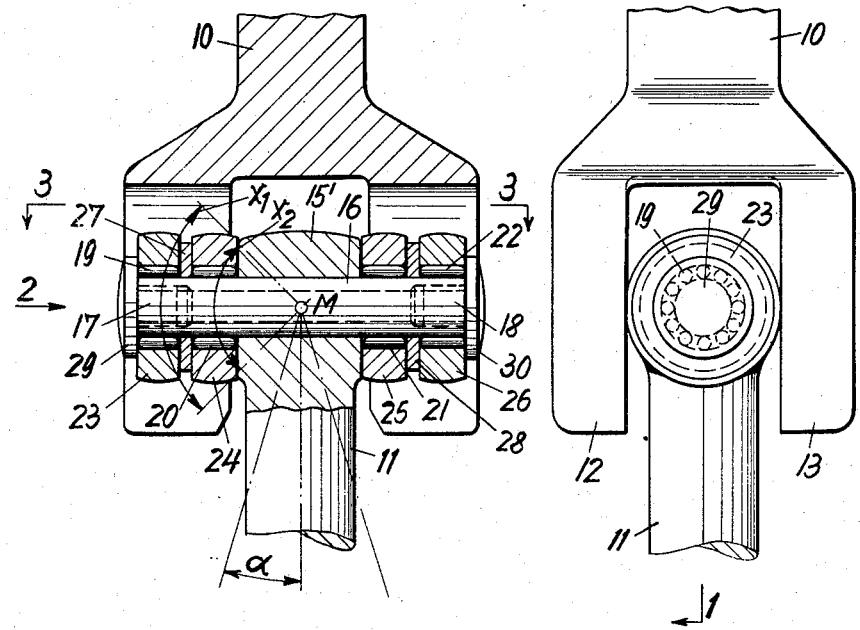
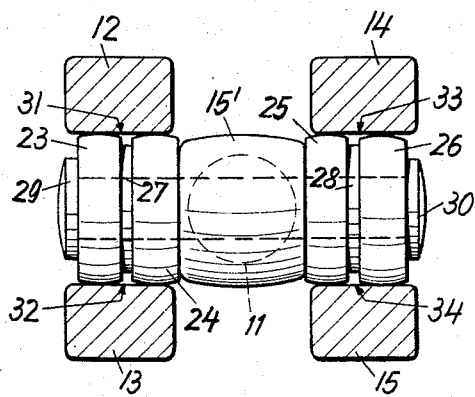
INVENTOR
LUDWIG KRAUS
BY Dicke and Craig
ATTORNEYS

United States Patent Office

2,874,556
Patented Feb. 24, 1959

2,874,556

UNIVERSAL JOINT

Ludwig Kraus, Stuttgart-Rotenberg, Germany, assignor to Daimler-Benz Aktiengesellschaft, Stuttgart-Unterturkheim, Germany Application July 5, 1955, Serial No. 519,988

Claims priority, application Germany July 2, 1954

6 Claims. (Cl. 64—8)

The present invention relates to new and useful improvements in universal joints, particularly for half-axles of motor vehicles.

It is the principal object of the present invention to provide a universal joint which is designed to reduce the friction which is bound to occur therein when driving such angularly disposed shafts.

An essential feature of the invention consists in the use of roller bearings for transmitting the driving torque from one to the other side of the universal joint.

It has further been found that if cylindrical bearings or bearing races are used for this purpose the disadvantage arises that, when driving such shafts which are angularly disposed to each other, the individual points within the line of contact between each bearing or race and the corresponding bearing surface of the other member of the joint and disposed substantially radially to the center of the joint are subject to different revolving speeds which necessarily results in a sliding friction along at least some of these points.

It is therefore another object of the present invention to overcome the above-mentioned disadvantage by making the individual races of such bearings of cambered or convexly curved shape so that the area of contact between each race and the respective bearing surface of the other member of the joint will be limited in a radial direction so that, in an extreme case, the contact will be pointlike and the difference between the minimum and maximum revolving speed of the rollers will be considerably reduced.

Another feature of the invention is that, for the same reason, two or more bearings may be mounted coaxially adjacent each other and on both sides of the pivot or bearing shaft. The roller bearings may then adapt themselves individually to the different distances from the center of the joint and roll along the corresponding bearing surfaces of the other member of the joint at different speeds. By additionally cambering the races of the roller bearings according to the invention, it will then be possible to couple the advantage of thus obtaining a very reliable transmission of the driving torque with that of a highly reduced sliding action between the race of each bearing and the flat bearing surfaces of the other member of the joint.

Further objects, features, and advantages of the present invention will appear from the following detailed description thereof, as well as from the accompanying drawings, in which Fig. 1 shows a longitudinal cross section through a universal driving joint, taken along line 1—1 of Fig. 2;

Fig. 2 shows a side view of the joint as seen in the direction of the arrow 2 shown in Fig. 1; while Fig. 3 shows a cross section taken along line 3—3 of Fig. 1.

Referring to the drawings, the two shafts to be connected by the universal joint according to the invention are indicated by numerals 10 and 11. The bifurcated end of shaft 10 consists of two pairs of parallel prongs 12, 13, and 14, 15 respectively, while the corresponding end of shaft 11 terminates in a fistlike portion 15′ which is inserted between the arms 12, 13, and 14, 15, respectively.

The jointed end 15′ of shaft 11 carries a transverse pin 16 which protrudes laterally therefrom and is rigidly secured thereto so as to form pivot pins 17 and 18 on which, by means of needle bearings 19, 20, 21, and 22, two pairs of roller-like races 23, 24 and 25, 26, respectively, are mounted, each pair being separated by a washer 27 or 28, respectively. The projecting heads 29 and 30 of a pair of bolts which are screwed into the outer ends of pin 16 secure the proper location of races 23 to 26 and needle bearings 19 to 22 in their axial direction. The peripheral surface of races 23 to 26 is cambered or convexly curved so that theoretically speaking, the area of contact of each of the races with the inner bearing surfaces 31 to 34 of the arms 12 to 15, respectively, is reduced substantially to a pointlike contact.

If shaft 11 turns to an inclined position relative to shaft 10 so that the axes of shafts 11 and 10 form, for example, an angle having an apex M, races 23 and 24 will then roll along the bearing surfaces 31 and 32 during the first half of each revolution of shafts 10 and 11 in the direction of arrows $x_1$ and $x_2$, and during the second half of each revolution in the opposite direction. The same applies to races 25 and 26. The speed of movement of the outer races 23 and 26 will then be greater than that of the inner rollers 24 and 25. Since the races 23 to 26 are cambered, there will be practically no sliding movement thereof. Since the races are provided in pairs, the driving torque will be reliably transmitted from one shaft to the other and at the same time the load upon the surface of the races 23 to 26 will be reduced to a minimum.

If applied to oscillating half-axles of automobiles, shafts 10 and 11 may be centered by such half-axles. However, shafts 10 and 11 may be centered directly, for example, by providing shaft 10 with a ball having a center M to engage in a corresponding ball socket on shaft 11. In such a case, the pivot pins 17 and 18 are preferably made integral with shaft 11.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. A universal joint comprising a driving member and a driven member, one of said members having a bifurcated end forming two pairs of opposite prongs, the opposite inner surfaces of said prongs forming flat and parallel bearing surfaces, the second member carrying on its end a bearing shaft, said bearing member being affixed at its mid-portion to said second member and projecting laterally from both sides thereof and extending transverse to the pivoting axis of said joint, said bearing shaft forming the pivot point of said joint, and at least two roller bearings on said bearing shaft on each side of said second member and mounted coaxially adjacent each other on each projecting end of said bearing shaft, each of said bearings comprising a plurality of cylindrical rollers around and in contact with said bearing shaft, an annular race surrounding said rollers, said race having a cambered peripheral surface, and means for securing said bearings so as to be substantially immovable in an axial direction relative to said bearing shaft, said second member engaging between the prongs of said first member so that opposite points of the cambered surface of said races are in substantially pointlike engagement with said flat bearing surfaces of said prongs for transmitting the driving force from one of said members to the other.

2. A universal joint, particularly for driving swinging half-axles of vehicles, comprising two joint members, roller means for transmitting the driving torque from the first member to the second member, a bearing shaft for supporting on the ends thereof said roller means, said bearing shaft being affixed at its mid-portion to said second member and being disposed in a transverse direction to the center line of said universal joint, said first member having a bifurcated end constituting two pairs of opposite prongs with the opposite inner surfaces thereof forming flat and parallel bearing surfaces, said roller means comprising two rollers arranged side by side at each end of said bearing shaft, said rollers having a cambered peripheral surface, and being in substantially point-like engagement with said inner surfaces of said prongs.

3. A universal joint according to claim 2, further comprising means for securing said rollers on each end of said bearing shaft so as to be substantially immovable in an axial direction relative thereto.

4. A universal joint according to claim 2, wherein said bearing shaft comprises a pin and means for securing said pin in said second member.

5. A universal joint according to claim 2, wherein said bearing shaft constitutes an integral part of said second member.

6. A universal joint comprising a driving member and a driven member, one of said members having a bifurcated end forming two parallel pairs of opposite prongs, the opposite inner surfaces of said prongs forming bearing surfaces, the second member carrying on its end a bearing shaft, said bearing member being affixed at its mid-portion to said second member and forming the pivot of said joint and extending transverse to the pivoting axis of said joint, and at least two antifriction bearings on said bearing shaft and on each side of said second member, each of said bearings comprising a plurality of rotatable elements around and in contact with said bearing shaft, and annular races surrounding said rotatable elements, said annular races having cambered peripheral surfaces, said second member engaging between the prongs of said first member so that opposite points of the peripheral surface of said races form the points of engagement with said bearing surfaces of said prongs for transmitting the driving force from one of said members to the other.

References Cited in the file of this patent

UNITED STATES PATENTS 2,626,511     Forsythe _____ Jan. 27, 1953

FOREIGN PATENTS 402,407     Italy _____ Mar. 6, 1943